3,037,056
AMIDO POLYGLYCOLS

Warren Lowe, San Francisco, Frank W. Kavanagh, Berkeley, Frank A. Stuart, Orinda, and William T. Stewart, El Cerrito, Calif., assignors to California Research Corporation, San Francisco, Calif., a corporation of Delaware
No Drawing. Filed Mar. 30, 1959, Ser. No. 802,645
2 Claims. (Cl. 260—561)

This invention relates to novel amido polyglycols. More particularly, the invention is concerned with important new ethylenically unsaturated acyl amido alkyl ethers of polyalkylene glycols useful in the preparation of valuable polymeric compounds.

The compounds of this invention are ethylenically unsaturated acyl amido alkyl ethers of polyalkylene glycols in which the unsaturated acyl groups attached to the nitrogen contain up to 20 carbon atoms, the amido alkyl group contains 2 to 7 carbon atoms, said ethylenically unsaturated acyl amido alkyl portion being either-linked to a member of the group consisting of polyalkylene glycols and alkyl ethers thereof having from 2 to 7 carbon atoms in each alkylene group, from 1 to 18 carbon atoms in the alkyl group and a molecular weight between about 220 and 30,000.

The amido polyglycols of the invention are superior monomeric intermediates for the preparation of valuable polymers. They polymerize readily with a wide variety of monomers to provide many types of polymers having polyglycol chains attached to the polymeric "backbone." Such polymers in turn are useful as detergents and dispersants in mineral lubricating oils and hydrocarbon fuels. They are also suitable as surface-active agents for other general applications.

Illustrative polymers containing the ethylenically unsaturated acyl amido alkyl ethers of polyalkylene glycols according to this invention are covered in copending application, Serial No. 729,560, of Frank A. Stuart, William T. Stewart, Warren Lowe, and Frank W. Kavanagh, filed April 21, 1958, of which the present application is a continuation-in-part. The aforesaid application issued as U.S. Patent No. 2,892,783 on June 30, 1959. Divisional application Serial No. 821,686 was filed June 22, 1959.

The amido polyglycols of the invention, which may also be termed ethylenically unsaturated acyl amido alkyl ethers of polyalkylene glycols, have the general structural formula:

$$R_1\overset{O}{\overset{\|}{C}}-\overset{R}{\overset{|}{N}}-R_2(OR_3)_nOR_4$$

wherein $R_1$ is alkenyl group of 2 to 19 carbon atoms, $R_2$ and $R_3$ are alkylene groups of 2 to 7 carbon atoms, $R_4$ is a member of the group consisting of hydrogen and alkyl groups of 1 to 18 carbon atoms, $R_5$ is a member of the group consisting of hydrogen, alkyl and hydroxyalkyl groups, said groups being of not more than 7 carbon atoms, and alkyl ethers of polyalkylene glycols having the formula: $-R_2(OR_3)_nOR_4$, and $n$ is an integer indicating the number of oxyalkylene groups in the polyalkylene glycol equal to the total molecular weight between about 220 and 30,000.

The alkenyl group attached to the carbonyl carbon in the unsaturated acyl amido alkyl ethers of polyalkylene glycols, according to the invention, may be either straight- or branched-chain in structure.

The alkylene group linking the nitrogen atom and the oxygen atom of the novel amido polyglycols contains from 2 to 7 carbon atoms, as mentioned above. Preferably, it has the same number of carbon atoms and structure as the alkylene groups in the polyalkylene glycol.

The polyglycol group of the compounds of the invention contains at least 4 alkylene oxide units with alkylene groups of from 2 to 7 carbon atoms each, as previously mentioned. Up to about 690 or, preferably, 230 of these alkylene oxide units may present in the polyglycol group. The end of the polyglycol group other than that linked to the ethylenically unsaturated acyl amido alkyl ether oxygen may be hydroxyl or alkyl, or it may have other terminal groups, including polar groups.

The polyalkylene glycols of the polyglycol monomeric compounds of the invention have the above-described essential characteristics. Poly-1,2-alkylene glycols and their alkyl ethers having molecular weights between about 220 and 30,000 are preferred. Such polyglycols may be obtained by polymerizing 1,2-alkylene oxides or mixtures thereof in the presence of a catalyst and a suitable initiator for the reaction such as water or monohydric aliphatic alcohol in the case of the alkyl ethers. The preparation of polyglycol compounds of this type has been fully described heretofore in the U.S. Patents 2,448,664 and 2,457,139, for example, and therefore requires no detailed discussion here.

For present purposes, the most suitable poly-1,2-alkylene glycol groups are those derived from ethylene oxide or from 1,2-propylene oxide or mixtures thereof and their alkyl ethers of 1 to 18 carbon atoms per alkyl group which have molecular weights or average molecular weights between about 220 and 30,000, preferably between about 400 to 10,000. These polyalkylene glycol groups provide monomers useful in the preparation of outstanding detergent copolymers.

The following polyalkylene glycol groups containing from 2 to 7 carbon atoms in each alkylene group are illustrative of the types described above.

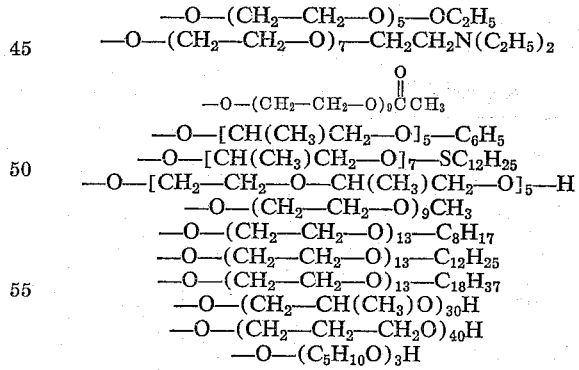

Polyethylene glycol mixtures having average molecular weights of 220, 400, 1000, 1540, 2000 or 10,000 and monoalkyl ethers thereof.
Poly-1,2-propylene glycol mixtures having average molecular weights of 425, 1025 or 10,000 and monoalkyl ethers thereof.

In the above illustrative polyalkylene glycol groups, the terminal O is the linking ether oxygen group, as already described, which connects the polyglycol portion to the unsaturated acyl amido alkyl portion of the molecule in the amido polyglycol monomers.

The ethylenically unsaturated acyl amido alkyl ethers of polyalkylene glycols according to the invention are prepared by various methods. For example, a suitable unsaturated acyl amide such as methacrylamide may be reacted with the desired quantity of a certain alkylene oxide such as ethylene oxide or 1,3-propylene oxide in the presence of a basic catalyst such as sodium methylate. Polymerization inhibitors such as quinone may be used. Pressure and heating are desirable to accelerate the reaction. In another method, the unsaturated acyl amido alkyl ethers of polyalkylene glycols may be prepared by the reaction of the sodio or potassio derivative of an unsaturated acyl amide with an omega-halopolyalkylene glycol or alkyl ether thereof in a basic medium.

The following examples are illustrative of the various ethylenically unsaturated acyl amido alkyl ethers of polyalkylene glycols according to the invention and their preparation. The proportions, unless otherwise specified, are given on a weight basis.

*Example I*

This example shows the preparation of methacrylamido ethyl ether of polyethylene glycol having a molecular weight of 1000.

To a rocker bomb was charged 5 grams sodium methylate (0.092 mole), 26.5 grams methacrylamide (0.31 mole), 0.5 gram quinone, and 160 grams dry benzene. The bomb was heated to 115° C., and 800 grams of ethylene oxide was pumped in over a four-hour period, while maintaining the temperature in the range of 115–120° C. The bomb was rocked for an additional 1¼ hours at 120° C. and then was cooled to room temperature. The benzene was removed by evaporation. Yield: 750 grams. The product had an equivalent weight of 1055 by weight balance and 1140 by hydroxyl number.

The above product was copolymerized with dodecyl methacrylate in the presence of free radical initiator azobisisobutyronitrile to give a polymer containing polyglycol units.

In the following table, additional examples of ethylenically unsaturated acyl amido alkyl ethers of polyethylene glycols according to the invention are given. In these examples, the amido polyglycols are prepared by the procedures outlined in the preceding examples.

| Example No. | Ethylenically Unsaturated Acyl Amide | Alkylene Oxide or Polyalkylene Glycol |
|---|---|---|
| II | Acrylamide | 1,2-propylene oxide (15 moles). |
| III | β-propylcrotonamide | Octadecyl ether of eicosaethylene glycol. |
| IV | Angelamide | Ethylene oxide and 1,2-propylene oxide mixture (10 moles in approximately 1:1 mole ratio). |
| V | Methacrylamide | Methyl monoether of polyethylene glycol (average molecular weight 750). |
| VI | 2-hexadecenoylamide | Ethylene oxide (200 moles). |
| VII | α-ethylacrylamide | 1,3-propylene oxide (4 moles). |
| VIII | N-hydroxypropyl methacrylamide | Ethylene oxide (40 moles). |

Other variations within the scope of this invention of the types of unsaturated acyl amido alkyl ethers of polyalkylene glycols will be apparent to one skilled in the art from the above illustrative examples.

What is claimed is:

1. Ethylenically unsaturated acyl amido alkyl ether of polyalkylene glycols having the formula:

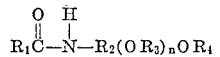

wherein $R_1$ is an alkenyl group of not more than 3 carbon atoms, $R_2$ and $R_3$ are 1,2-alkylene groups of not more than 3 carbon atoms, $R_4$ is a member of the group consisting of hydrogen and alkyl groups of 1 to 18 carbon atoms, and $n$ is an integer of from 4 to about 230 indicating the number of oxyalkylene groups in the polyalkylene glycol equal to a total molecular weight between about 400 and 10,000.

2. Methacrylamido ethyl ether of polyethylene glycol in which the polyethylene glycol has a molecular weight of approximately 1000.

References Cited in the file of this patent

UNITED STATES PATENTS

| | | |
|---|---|---|
| 2,146,873 | Wilmanns et al. | Feb. 14, 1939 |
| 2,576,501 | Dalton | Nov. 27, 1951 |
| 2,677,700 | Jackson et al. | May 4, 1954 |
| 2,792,367 | De Groote et al. | May 14, 1957 |
| 2,808,397 | Stroh et al. | Oct. 1, 1957 |
| 2,892,783 | Stuart et al. | June 30, 1959 |